(12) United States Patent
Barnum

(10) Patent No.: US 10,181,067 B2
(45) Date of Patent: Jan. 15, 2019

(54) SYSTEMS AND METHODS FOR GENERATING AND READING INTRINSIC MATRIXED BAR CODES

(71) Applicant: Capital One Services, LLC, McLean, VA (US)

(72) Inventor: Eric Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/899,631

(22) Filed: Feb. 20, 2018

(65) Prior Publication Data

US 2018/0365459 A1 Dec. 20, 2018

Related U.S. Application Data

(63) Continuation of application No. 15/704,403, filed on Sep. 14, 2017, now Pat. No. 9,928,393, which is a
(Continued)

(51) Int. Cl.
*G06K 7/10* (2006.01)
*G06K 19/06* (2006.01)
*G06K 7/14* (2006.01)

(52) U.S. Cl.
CPC ....... *G06K 7/10722* (2013.01); *G06K 7/1417* (2013.01); *G06K 19/06037* (2013.01)

(58) Field of Classification Search
CPC .................................. G06K 7/10; G06K 7/14
(Continued)

(56) References Cited

U.S. PATENT DOCUMENTS

2002/0020747 A1  2/2002 Wakamiya et al.
2007/0246542 A1* 10/2007 Manheim ................. G06K 5/00
                                                             235/487
(Continued)

FOREIGN PATENT DOCUMENTS

EP        1868137 A1   12/2007
EP        2416277 A1    2/2012
WO   WO 2015/083055 A1  6/2015

OTHER PUBLICATIONS

European Office Action dated Oct. 22, 2018, for counterpart European Application No. 18177622.0.

*Primary Examiner* — Daniel A Hess
(74) *Attorney, Agent, or Firm* — Finnegan, Henderson, Farabow, Garret & Dunner LLP

(57) ABSTRACT

The present disclosure relates to systems and methods for decoding matrixed bar codes, such as Quick Response ("QR") codes. In one implementation, system for decoding an intrinsic matrixed bar code may include an image-receiving device; at least one processor configured to execute instructions; and at least one memory storing the instructions. The instructions may be to perform operations including receiving an image using the image-receiving device; determining a grid for the image, the grid having a plurality of cells; selecting at least one cell of the grid as a candidate cell for containing an intrinsic matrixed bar code; extracting at least one intrinsic matrixed bar code located within the candidate cell; determining that the at least one extracted matrixed bar code is degraded; and repairing the at least one extracted matrixed bar code.

20 Claims, 8 Drawing Sheets

Related U.S. Application Data continuation of application No. 15/695,428, filed on Sep. 5, 2017, now Pat. No. 9,928,632.

(60) Provisional application No. 62/519,212, filed on Jun. 14, 2017.

(58) Field of Classification Search
USPC .............................. 235/462.11, 437; 382/100
See application file for complete search history.

(56) References Cited

U.S. PATENT DOCUMENTS

| | | |
|---|---|---|
| 2009/0206159 A1 | 8/2009 | Epshteyn et al. |
| 2012/0327117 A1 | 12/2012 | Weller et al. |
| 2013/0301870 A1 | 11/2013 | Mow et al. |
| 2016/0078335 A1 | 3/2016 | Annamalai et al. |

* cited by examiner

SYSTEMS AND METHODS FOR GENERATING AND READING INTRINSIC MATRIXED BAR CODES

CROSS-REFERENCE TO RELATED APPLICATIONS

This application is a continuation of U.S. application Ser. No. 15/704,403, filed Sep. 14, 2017, which is a continuation of U.S. application Ser. No. 15/695,428, filed Sep. 5, 2017, which claims priority to U.S. Provisional Application No. 62/519,212, filed Jun. 14, 2017. The entire contents of the above are incorporated herein by reference.

TECHNICAL FIELD

This disclosure relates generally to the field of matrix barcodes and their application to dynamically identifying visual media. More specifically, and without limitation, this disclosure relates to systems and methods for generating and decoding intrinsic QR codes.

BACKGROUND

QR ("Quick Response") codes are popular matrix barcodes for encoding information in one or more of four standardized encoding modes—matrix, alphanumeric, byte/binary, and/or Kanji (i.e., Japanese characters). QR codes, which are two-dimensional, may hold approximately 100 times more information than traditional one-dimensional barcodes such as UPCs. In addition, QR codes may be digitally scanned, e.g., by using the camera on a smart phone, rather than mechanically scanned, e.g., by using a laser scanner.

Commercial applications for QR codes are primarily for informational purposes, like pricing information, but are also used in advertising as a way of encoding a URL. However, QR codes can be visually intrusive, irritating the viewer, and thus discouraging viewer interaction. QR codes may also be limited to a relatively small amount of information due to format constraints. Generally, the more content a QR code contains, the more extensive and intrusive it becomes. For example, a content-heavy QR is generally heavily pixelated and is more likely to create a visual artifact that degenerates the art. Some content-heavy QR codes may even look almost like a black square. In addition, using a plurality of QR codes in a single advertisement may confuse the viewer because one QR code may look similar to the other ones. QR readers are additionally limited to processing only one code at a time, unless they have been commercially modified for other purposes.

At present, there is no available method to integrate QR codes into an image or video so that it is part of the image or video frame. Current use of QR codes for such purposes embed the QR code near the image.

SUMMARY

Disclosed systems and methods for generating "intrinsic" QR codes may permit for unobtrusive integration of QR codes with images and videos by use of a registration mark or intrinsically into the image itself. In addition, disclosed systems and methods for reading intrinsic QR codes are described. Thus, if an intrinsic QR code is generated, it may be integrated into an image, video frame, or within interlaced/progressive video scans (the white space) and allow a consumer to interact with the image or video rather than an obtrusive QR code. For example, a centralized content creator database may deliver one or more notifications or other data to a consumer in response to a request from the intrinsic QR reader. Moreover, a plurality of intrinsic QR codes may be integrated into a single image or frame, and the intrinsic QR reader may then allow the consumer to select which of the plurality of QR codes is relevant to their interest. For example, if a billboard has two intrinsic QR codes, one providing a link to a product and one providing a link to a video commercial, the intrinsic QR reader may generate a menu for the consumer to choose whether to have more information about the product or the video commercial delivered to an associated device, like a smartphone.

There are many possible applications for such capabilities. Examples of applications include integrating intrinsic QR codes with still-image advertising like billboards and pamphlets as well as integrating intrinsic QR codes with video advertising like television commercials. Additional examples of application may include generating intrinsic QR codes with copyright or trademark information, thereby allowing detection of infringement without the use of obtrusive watermarks.

Certain embodiments of the present disclosure relate to systems and methods for generating and decoding intrinsic QR codes. As used herein, "intrinsic" QR codes refer to QR codes that are digitally or physically placed into an existing image and have at least some transparency so as to be invisible to the human eye. Intrinsic QR codes allow advertisers to integrate QR codes more seamlessly with traditional advertisements. They also allow users to interact more organically with still-image and/or video advertising. Intrinsic QR codes could also be integrated with other visual media, such as clothing, wallpaper, packaging, mail, or the like.

While embodiments of the present disclosure are referenced as utilizing "intrinsic QR codes," one of ordinary skill will understand that other types of visible symbology can be used with the disclosed embodiments as well. For example, one-dimensional bar codes (e.g., Code 39, Code 128) or two-dimensional bar codes (e.g., Code 49, PDF417, Maxicode/Code 6, Data Matrix, SuperCode, Ultracode) can be used in place of or in addition to QR codes. These and other different methods of coded information may be referred to as "matrixed bar codes" for the purposes of this application.

According to an exemplary embodiment of the present disclosure, a system for generating an intrinsic matrixed bar code may comprise an image-receiving device, a processor configured to execute instructions, and a memory storing the instructions. The instructions may comprise instructions to: receive an image using the image-receiving device, generate a registration mark corresponding to the received image, select coordinates on the received image, overlay one or more matrixed bar codes on the selected coordinates, update the registration mark with the selected coordinates, and overlay the registration mark on the received image.

According to another embodiment of the present disclosure, a system for decoding an intrinsic matrixed bar code may comprise an image-receiving device, a processor configured to execute instructions, and a memory storing the instructions. The instructions may comprise instructions to: receive an image using the image-receiving device and determine whether the received image contains at least one registration mark. When the received image is determined to have at least one registration mark, the processor may determine, from the at least one registration mark, one or more coordinates. When the received image is determined not to have at least one registration mark, the processor may determine one or more coordinates based on a detected color shifting of a portion of the image. The instructions may further comprise instructions to determine, from the at least one registration mark, one or more coordinates, and extract one or more matrixed bar codes overlaid on the received image and located at the one or more coordinates.

According to another embodiment of the present disclosure, a method for generating an intrinsic matrixed bar code may comprise receiving an image; generating a registration mark corresponding to the received image; selecting coordinates on the received image; overlaying one or more matrixed bar codes on the selected coordinates; updating the registration mark with the selected coordinates; and overlaying the registration mark on the received image.

According to another embodiment of the present disclosure, a method for decoding an intrinsic matrixed bar code may comprise receiving an image and determining whether the received image contains at least one registration mark. The method may further include, when the received image is determined to have at least one registration mark, determining, from the at least one registration mark, one or more coordinates. The method may further include, when the received image is determined not to have at least one registration mark, determining one or more coordinates based on a detected color shifting of a portion of the image. The method may further include determining, from the at least one registration mark, one or more coordinates, and extracting one or more matrixed bar codes overlaid on the received image and located at the one or more coordinates.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
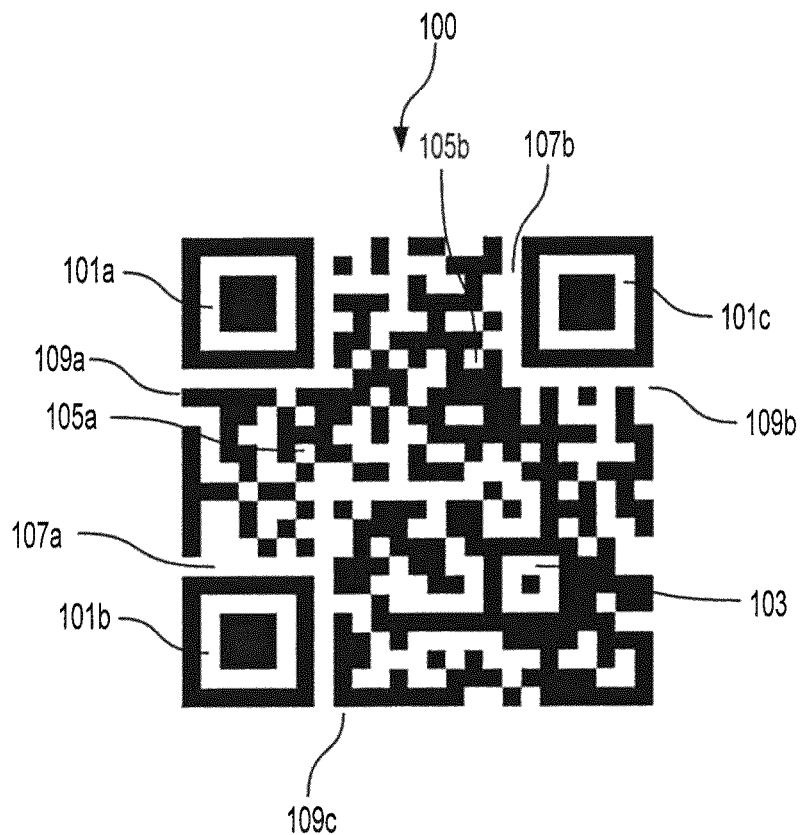
FIG. 1 is a schematic representation of an example QR code as known in the art.

The disclosed embodiments relate to systems and methods for generating and decoding intrinsic matrixed bar codes. Although embodiments of the present disclosure use the term "QR code," the disclosed systems and methods may be used with a variety of different symbologies, including, for example, matrixed bar codes. Embodiments of the present disclosure may be implemented using a general purpose computer. Alternatively, a special purpose computer may be built according to embodiments of the present disclosure using suitable circuit elements.

As used herein, the term "image" may connote digital information stored in an appropriate format, for example, static image formats (e.g., bitmap, Graphics Interchange Format ("GIF"), Portable Network Graphics format ("PNG"), Joint Photographic Experts Group ("JPEG")) or dynamic formats (e.g., animated GIF, MPEG-4, Flash Video ("FLV"), Windows Media Video ("WMV")).

According to an aspect of the present disclosure, a system for generating an intrinsic QR code may comprise an image-receiving device, a processor configured to execute instructions, and a memory storing the instructions.

In some embodiments, the processor may be configured to receive an image. The image may be received from an image-receiving device, for example, a digital camera, network interface controller, bus, etc. For example, the image may comprise digital information stored in a static format (a "static image") or digital information stored in a dynamic format (a "dynamic image"). In some embodiments, the processor may divide the digital information stored in a dynamic format into a series of frames (or series of static images) and process each static image individually.

According to an aspect of the present disclosure, the processor may be further configured to generate a registration mark to be associated with the image and provide information supplemental to the image. In some embodiments, generating a registration mark may comprise generating an information container row. For example, the information container row may reflect a plurality of properties about the image. By way of further example, the information container row may reflect whether the image is a static image or a dynamic image. In some embodiments, the processor may indicate the image is a dynamic image if the image comprises a static frame derived from a dynamic image.

By way of further example, the information container row may reflect whether the registration mark will be embedded in an image (e.g., being shrunk and then placed in the corner of the image), placed external to the image (e.g., next to the image), or the like. In some embodiments, the information container row may further reflect a determination by the processor whether the image has a landscape or portrait orientation.

By way of further example, if the image is a dynamic image, the information container row may reflect whether an intrinsic QR code will be embedded in the current frame. In some embodiments, the information container row may contain additional information and/or contain an "end of grid" signal (indicating, e.g., that no additional information is contained in the information container row). In other embodiments, the information container row may contain different information than the information referenced above and/or contain an end of grid signal.

In some embodiments, generating a registration mark may further comprise dividing the image into a grid. In certain aspects, the processor may divide the image into a grid based on a preset input. In other aspects, the processor may dynamically determine one or more optimal grids and/or select a grid into which to divide the image.

According to an aspect of the present disclosure, the processor may be further configured to select coordinates on the image specifying a location for the placement of one or more intrinsic QR codes. In some embodiments, the processor may select the coordinates based on a preset input. For example, a user may transmit selected coordinates to the processor. In other embodiments, the processor may dynamically determine one or more optimal coordinates and/or select coordinates onto which to overly the one or more intrinsic QR codes. For example, the processor may color shift the pixels within one or more sub-areas (e.g., one or more portions of the grid) of the received image and select coordinates based on whether the color variance and the size of a sub-area exceeds a variance threshold and a size threshold, respectively. The processor may use a combination of dynamic determination and user input to select coordinates.

In some embodiments, the processor may be further configured to overlay one or more QR codes on the selected coordinates. For example, the processor may generate the one or more QR codes based on received input. In other aspects, the one or more QR codes may be received by the processor, either together with or separately from the received image.

In some embodiments, overlaying one or more QR codes may comprise one or more of pasting the QR codes onto the selected coordinates, shrinking the QR codes, or applying a transparency to the QR codes. The processor may apply the transparency before and/or after shrinking the QR codes.

In embodiments where the image has been divided into a grid, the processor may be further configured to color-shift the portion of the image immediately underneath and/or adjacent to one or more QR codes that have been overlaid. For example, if a QR code has been overlaid on the image, the portion of the image immediately underneath and/or adjacent to that QR code may be color-shifted to gray (or another color) by a small percentage, e.g., 5%, 1%, or less. This may allow an intrinsic QR reader to easily find the overlaid QR code within the image while remaining invisible to the human eye.

According to an aspect of the present disclosure, the processor may be further configured to update the registration mark. For example, the processor may update the registration mark to correspond to the grid into which the image was divided. The processor may further update the registration mark to indicate which portions of the grid contain overlaid QR codes and/or to indicate the color-shift immediately underneath and/or surrounding the overlaid QR codes.

In some embodiments, the processor may be further configured to place the registration mark in the image. For example, placing the registration mark may comprise shrinking the mark and/or overlaying the mark on an unobtrusive portion of the image, e.g., the corner. In other embodiments, the processor may be configured to output the registration mark directly, e.g., for use external to the image.

According to another aspect of the present disclosure, a system for decoding an intrinsic QR code may comprise an image-receiving device, a processor configured to execute instructions, and a memory storing the instructions.

In some embodiments, the processor may be configured to receive an image. As explained previously, the image may be received from an image-receiving device, for example, a digital camera, network interface controller, bus, or the like. For example, the image may comprise a static image or a dynamic image. In some embodiments, the processor may divide a dynamic image into a series of frames or static images and process each frame/image individually.

According to an aspect of the present disclosure, the processor may be further configured to determine whether the image contains a registration mark. In some embodiments, a registration mark may be embedded in the image, e.g., in a corner or in the center of the image. In other embodiments, a registration mark may be external to the image, e.g., received separately by the image-receiving device, received separately from a memory, or the like.

In some embodiments, the processor may be further configured to determine locations/coordinates within the image containing embedded QR codes using the registration mark. For example, the registration mark may contain a grid indicating which portions of the grid contain embedded QR codes; the processor may then select those portions of the image for further processing.

According to an aspect of the present disclosure, the processor may be further configured to extract QR codes from the determined locations/coordinates. In some embodiments, extracting QR codes may comprise determining that a portion of the selected location contains a color-shift, analyzing the color-shifted portion to separate a QR code having transparency from other layer(s) of the image, and decoding the separated QR code.

In some embodiments, the processor may be further configured to transmit the decoded QR code to a display device. In other embodiments, the processor may be further configured to transmit the decoded QR code for further processing. For example, if the decoded QR code comprises a URL, the processor may transmit the URL to a web browser for further processing.

Embodiments of the present disclosure also relate to methods and computer-readable media that implement the above embodiments.

Reference will now be made in detail to exemplary embodiments and aspects of the present disclosure, examples of which are illustrated in the accompanying drawings.

FIG. 1 is a schematic representation of example QR code 100. QR Code 100 may include one or more positioning markings, e.g., markings 101a, 101b, and 101c. Positional markings are generally square and occupy a plurality of corners of the QR code. Positional markings 101a, 101b, and 101c may allow a QR reader to correctly align QR Code 100. QR Code 100 may optionally include one or more alignment markings, e.g., marking 103. Alignment markings are generally square and occupy one or more interior positions of the QR code. Alignment marking 103 may further allow a QR reader to correctly align QR Code 100.

As depicted in FIG. 1, QR Code 100 may further include one or more timing patterns, e.g., patterns 105a and 105b. Generally, a timing pattern comprises a single line of markings that runs vertically or horizontally between two positional markings. Timing patterns 105a and 105b may allow a QR reader to determine the size of the data matrix encoded in QR code 100. As further depicted in FIG. 1, QR Code 100 may include version markings, e.g., markings 107a and 107b. Generally, version markings comprise three lines of markings that immediately above, below, or adjacent to a positional marking. Version markings 107a and 107b may allow a QR reader to determine which standardized version of QR was used to format QR Code 100. For example, QR Code 100 may be formatted according to one of forty standardized versions of QR.

As further depicted in FIG. 1, QR Code 100 may include format markings, e.g., markings 109a, 109b, and 109c. Generally, format markings comprise one or more single lines of markings that are immediately above, below, or adjacent to a positional marking. Format markings 109a, 109b, and 109c may allow a QR reader to determine the error tolerance and the data mask pattern encoded in QR Code 100.

The remaining portions of QR Code 100 depicted in FIG. 1 may include the encoded data. For example, QR Code 100 may include an encoded URL. A QR reader may thus scan QR Code 100, decode the URL, and open the URL in a web browser.

Figure 2:
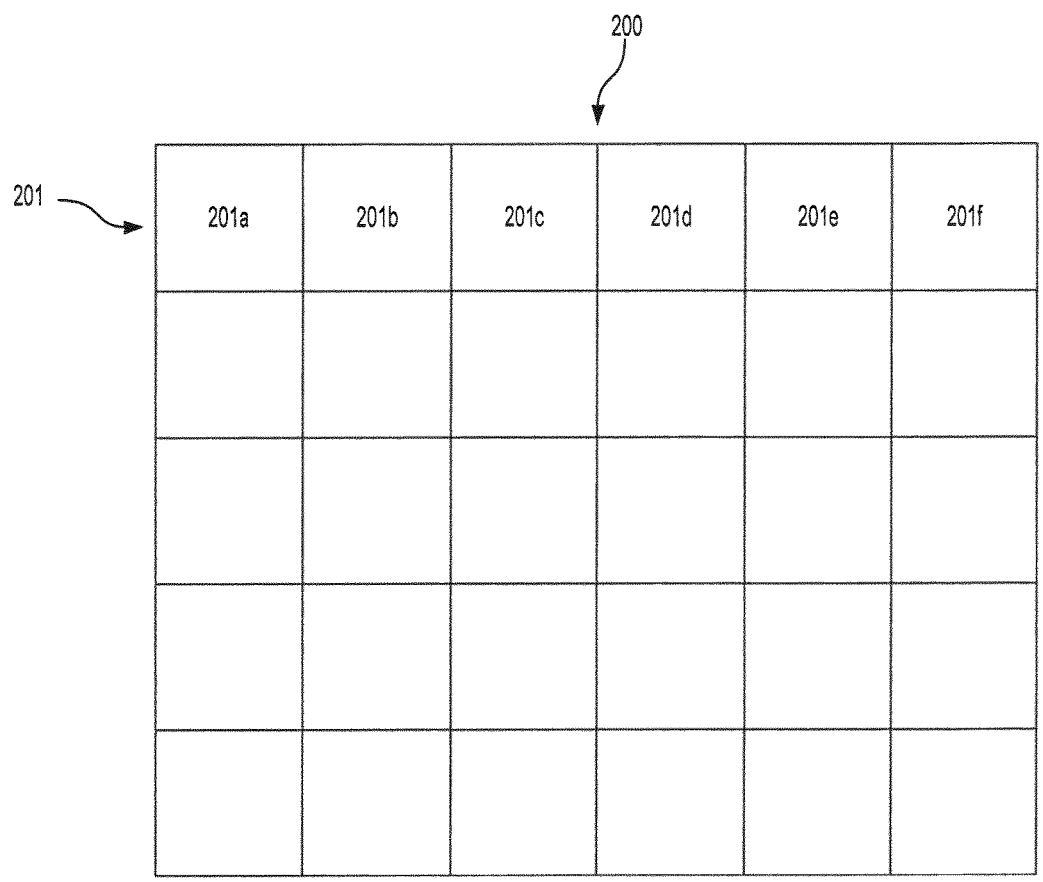
FIG. 2 is a schematic representation of the structure of an exemplary registration mark, consistent with embodiments of the present disclosure.

FIG. 2 is a schematic representation of the structure of exemplary registration mark 200. Although FIG. 2 depicts registration mark 200 as a five by six matrix, any matrix of appropriate size may be used as a registration mark. For example, registration mark 200 may be optimized to include sufficient information to enable an intrinsic QR reader to read corresponding intrinsic QR codes while being of minimal size.

As depicted in FIG. 2, registration mark 200 includes an information container row 201. Row 201 may allow the intrinsic QR reader to determine properties about an image corresponding to registration mark 200 based on the shading of the row.

As further depicted in FIG. 2, row 201 includes a plurality of cells, e.g., cells 201a, 201b, 201c, 201d, 201e, and 201f. Cell 201a may indicate whether the image is static or dynamic. For example, if cell 201a is white or transparent, an intrinsic QR reader may determine that one or more intrinsic QR codes are embedded in a static image like a poster or brochure. On the other hand, if cell 201a is neither white nor transparent, an intrinsic QR reader may determine that one or more intrinsic QR codes are embedded in a dynamic image like a commercial. Such a determination may allow an intrinsic QR reader to perform an appropriate amount of scans on a received image; for example, a static image may require only one scan while a dynamic image may require multiple scans, for example, if the dynamic image comprises an interlaced video.

In some embodiments, cell 201b may indicate whether registration mark 200 is embedded within the image. For example, if cell 201b is blank, an intrinsic QR reader may determine that registration mark 200 is external to the image. On the other hand, if cell 201b is shaded, an intrinsic QR reader may determine that registration mark 200 is embedded within the image. Such a determination may allow an intrinsic QR reader to scan the image more effectively; for example, if the registration mark is external to the image (e.g., by being next to it rather than embedded in it), the intrinsic QR reader need not exclude any portion of the image while scanning for intrinsic QR codes. On the other hand, if the registration mark is embedded in the image (e.g., by being in the corner), the intrinsic QR reader may exclude the portion of the image including the registration mark while scanning.

In some embodiments, cell 201c may indicate orientation. For example, if cell 201c is blank, an intrinsic QR reader may determine that the image is in portrait orientation. On the other hand, if cell 201c is shaded, an intrinsic QR reader may determine that the image is in landscape orientation.

In some embodiments, cell 201d may be reserved for dynamic content. For example, cell 201d may indicate whether intrinsic QR codes are embedded in a current frame of an associated video. (Registration mark 200 may be, for example, embedded in one or more frames of that video.) In this example, if cell 201d is blank, an intrinsic QR reader may determine that the current frame does not have intrinsic QR codes—though a later frame may have one or more intrinsic QR codes. On the other hand, if cell 201d is shaded, an intrinsic QR reader may determine that the current frame does have intrinsic QR codes and thus uses registration mark 200 to extract the intrinsic QR codes.

In some embodiments, cells 201e and 201f may indicate the end of the grid. For example, cells 201e and 201f may both be blank in order to indicate the end of the grid. By way of further example, cells 201e and 201f may both be shaded in order to indicate the end of the grid.

The remaining portions of registration mark 200 depicted in FIG. 2 may indicate the location of one or more intrinsic QR codes within the image. For example, excluding information container row 201, registration mark 200 includes a four by six matrix. A QR reader may divide the image into a grid (in this example a four by six matrix grid). (An example is described below with respect to FIG. 3.) By way of further example, shaded boxes within registration code 200 indicate where in the grid the intrinsic QR codes are embedded. Accordingly, an intrinsic QR reader may extract the embedded QR codes from locations indicated by registration mark 200.

Other embodiments that include additional cells and/or exclude cells depicted in FIG. 2 are possible. In addition, other embodiments may include additional cells reserved for dynamic content and/or additional cells reserved for static content.

Figure 3:
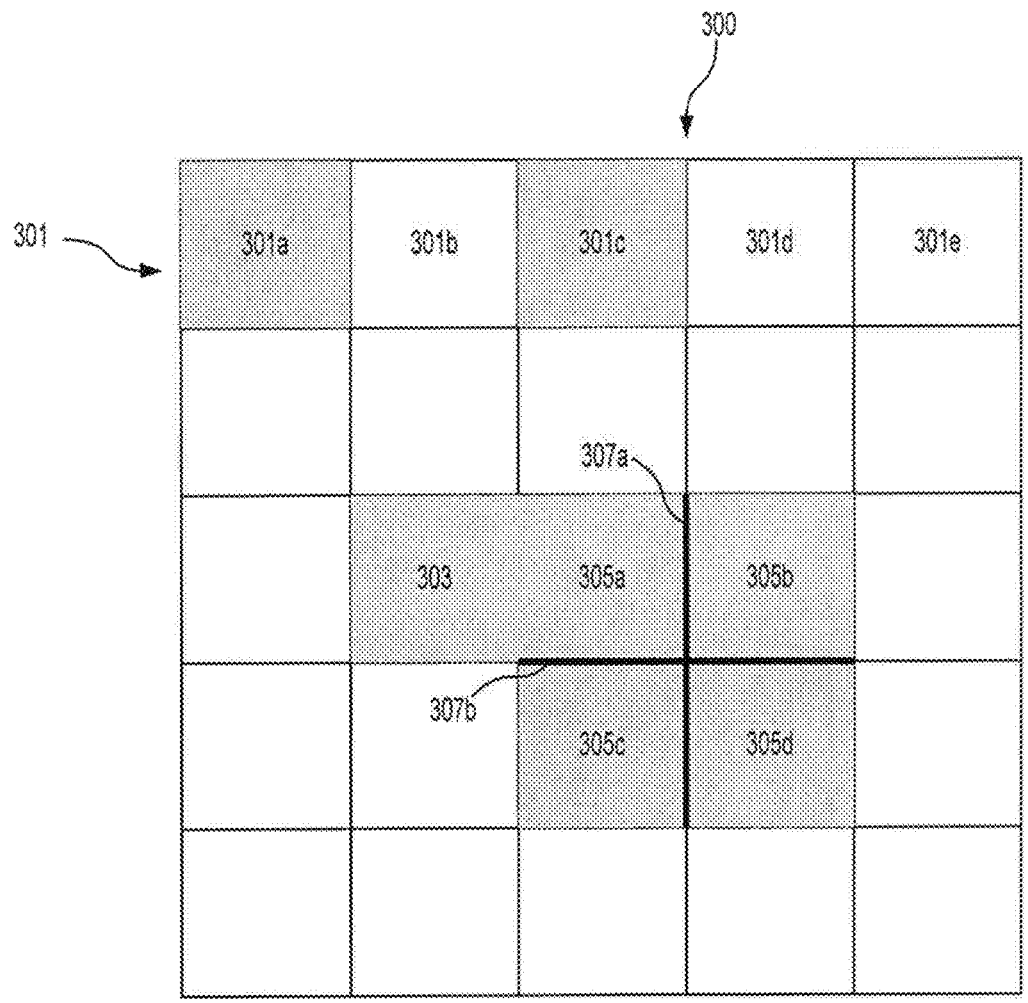
FIG. 3 is a depiction of an example registration mark, consistent with embodiments of the present disclosure.

FIG. 3 is a depiction of an example registration mark 300. As depicted in FIG. 3, example mark 300 comprises a five by five matrix with information container row 301. In addition, the colored boxes in mark 300 are colored gray; an intrinsic QR reader may thus determine that the relevant color shifting in the image is gray.

As further depicted in FIG. 3, cell 301a in row 301 is colored. For example, an intrinsic QR reader may determine that the image is a dynamic image. In addition, as depicted in FIG. 3, cell 301b is white or transparent. For example, an intrinsic QR reader may determine that the registration mark is external to the dynamic image itself.

As depicted in FIG. 3, cell 301c is colored. For example, an intrinsic QR reader may determine that the orientation of the dynamic image is a landscape orientation. As further depicted in FIG. 3, cells 301d and 301e are white. For example, an intrinsic QR reader may determine that cells 301d and 301e therefore serve as the end of grid signal.

The remaining portions of registration mark 300 depicted in FIG. 3 may indicate the location of one or more intrinsic QR codes within the image. For example, excluding information container row 301, registration mark 300 includes a four by five matrix. Accordingly, an intrinsic QR reader may divide the dynamic image into a four by five grid.

As depicted in FIG. 3, cell 303 is colored gray. For example, an intrinsic QR reader may determine that an intrinsic QR code is embedded in the area of the image that corresponds to cell 303 of the image. Such a determination may permit the intrinsic QR reader to extract the intrinsic QR code from the image.

As depicted in FIG. 3, cells 305a, 305b, 305c, and 305d are colored gray and are lined with lines 307a and 307b. For example, an intrinsic QR reader may determine that an intrinsic QR code is embedded in the area of the image corresponding to the boundary between cells 305a, 305b, 305c, and 305d. Such a determination may permit the intrinsic QR reader to extract the intrinsic QR code from the boundary demarcated by lines 307a and 307b.

Figure 4:
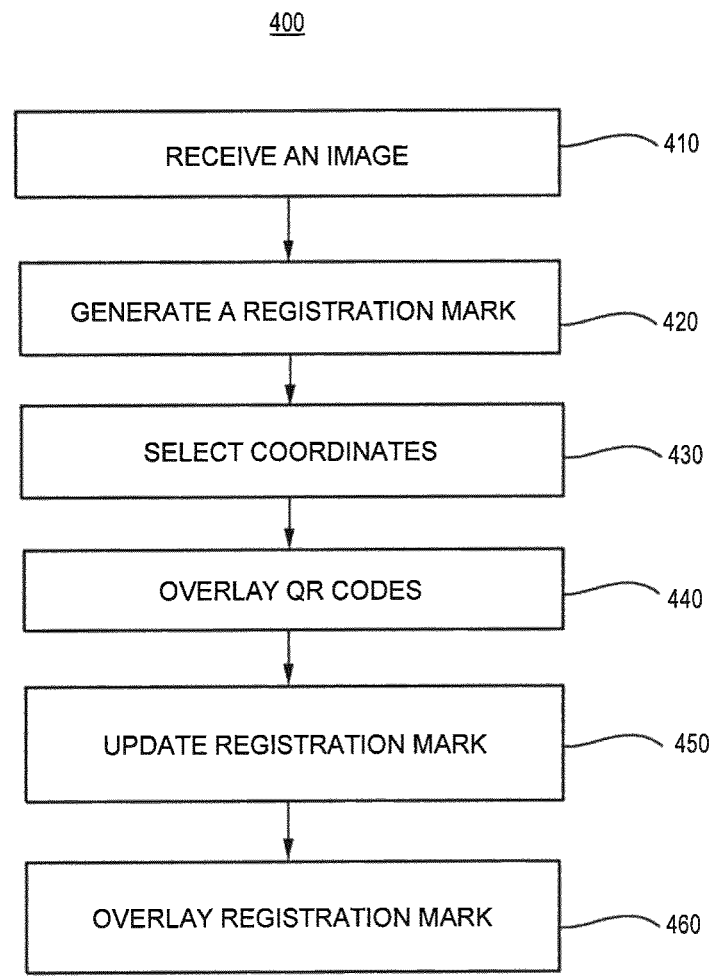
FIG. 4 is a flowchart of an exemplary method for generating an intrinsic QR code, consistent with embodiments of the present disclosure.

FIG. 4 is a flowchart of exemplary method 400 for generating an intrinsic QR code. Exemplary method 400 may be implemented by, for example, system 700 of FIG. 7A. Exemplary method 400 may further be implemented using a general purpose computer or special purpose computer.

At step 410, the processor receives an image. For example, the image may be received from an image-receiving device, for example, a digital camera, network interface controller, bus, etc. The image may comprise a static image or a dynamic set of images such as video frames or an "animated" image. In some embodiments, receiving an image may further comprise dividing the image into a series of frames or images and processing each frame/image individually.

At step 420, the processor generates a registration mark corresponding to the image. (In some embodiments, generating a registration mark may comprise one or more steps of method 500 of FIG. 5, described below.) For example, generating a registration mark may comprise dividing the received image into a grid. In certain aspects, the processor may divide the image into a grid based on a preset input. In other aspects, the processor may dynamically determine one or more "optimal" grids and/or select a grid into which to divide the image. For example, the processor may select a grid that maximizes RGB variance, either within at least one cell or across the totality of cells. By way of further example, the processor may select a grid that packs any monochrome portions together since such portions are poor candidates for intrinsic QR.

At step 430, the processor selects coordinates on the image for the placement of one or more intrinsic QR codes. For example, the coordinates may comprise locations on a grid. In some embodiments, the processor may select the coordinates based on a preset input. In other embodiments, the processor may dynamically determine one or more optimal coordinates and/or select coordinates onto which to overly the one or more intrinsic QR codes.

At step 440, the processor overlays one or more QR codes on the selected coordinates. For example, the one or more QR codes may be generated by the processor based on received input. In other aspects, the one or more QR codes may be received by the processor, either with or separately from the received image. In some embodiments, overlaying one or more QR codes may comprise one or more of pasting the QR codes onto the selected coordinates, shrinking the QR codes, or applying a transparency to the QR codes. The processor may apply the transparency before and/or after shrinking the QR codes. The degree of transparency may be determined by one or more predetermined settings or automatically based on the average color-shift of the portion of the image immediately underneath a QR code.

In some embodiments, method 400 may include color-shifting the portion of the image immediately underneath and/or adjacent to one or more QR codes that have been overlaid. For example, if a QR code has been overlaid on the image, the portion of the image immediately underneath and/or adjacent to that QR code may be color-shifted to gray by a small percentage, e.g., 5%, 1%, or less. As explained above, this may allow an intrinsic QR reader to easily find the overlaid QR code within the image.

At step 450, the processor updates the registration mark. For example, the processor may update the registration mark to correspond to the grid into which the image was divided. By way of further example, the processor may update the registration mark to indicate which portions of the grid contain overlaid QR codes and/or to indicate the color-shift immediately underneath and/or surrounding the overlaid QR codes.

In some embodiments, steps 420 and 450 may be combined—that is, the registration mark may be fully generated after overlaying one or more QR codes on the image.

At step 460, the processor places the registration mark in the image. For example, placing the registration mark may comprise shrinking the mark and/or overlaying the mark on an unobtrusive portion of the image, e.g., the corner. However, in some embodiments, step 460 may be omitted, and instead the processor may output the registration mark directly, e.g., for use external to the image.

Figure 5:
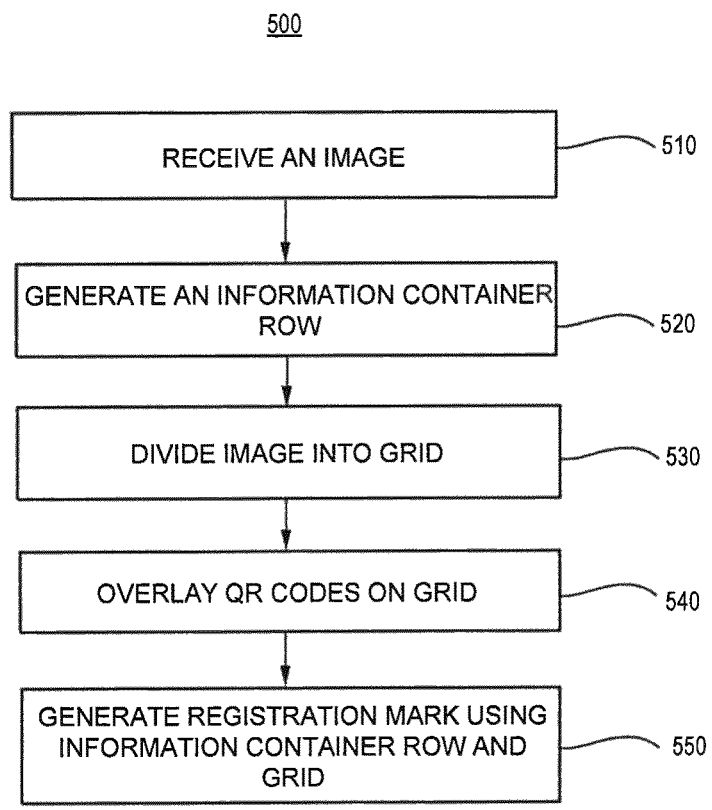
FIG. 5 is a flowchart of an exemplary method for generating a registration mark, consistent with embodiments of the present disclosure.

FIG. 5 is a flowchart of exemplary method 500 for generating a registration mark. Exemplary method 500 may be performed, for example, system 700 of FIG. 7A. Exemplary method 500 may further be implemented using a general purpose computer or special purpose computer.

At step 510, the processor receives an image. For example, the image may be received from an image-receiving device, for example, a digital camera, network interface controller, bus, etc. The image may comprise a static image or a dynamic set of images such as video frames or an "animated" image. In some embodiments, receiving an image may further comprise dividing the image into a series of frames or images and processing each frame/image individually.

At step 520, the processor generates an information container row. For example, the information container row may reflect a plurality of properties about the image. By way of further example, the information container row may reflect a determination by the processor whether the image is a static image or a dynamic image; a determination by the processor whether the registration mark will be embedded in the image (e.g., being shrunk and then placed in the corner of the image) or will be placed external to the image (e.g., next to the image); a determination by the processor whether the image has a landscape or portrait orientation; etc. The information container row may further contain additional information and/or an end of grid signal. In some embodiments, the information container row may contain information other than that described above.

At step 530, the processor divides the image into a grid. For example, the processor may divide the image into a grid based on a preset input. In other aspects, the processor may dynamically determine one or more optimal grids and/or select a grid into which to divide the image.

At step 540, the processor overlays one or more QR codes on the selected coordinates. For example, the one or more QR codes may be generated by the processor based on received input. In other aspects, the one or more QR codes may be received by the processor, either together with or separately from the received image. In some embodiments, overlaying one or more QR codes may comprise pasting the QR codes onto the selected coordinates, shrinking the QR codes, and applying a transparency to the QR codes. The processor may apply the transparency before and/or after shrinking the QR codes.

At step 550, the processor generates the registration mark. For example, the processor may generate the registration mark using the information container row and the grid. By way of further example, the processor may also configure the generated registration mark to indicate which portions of the grid contain overlaid QR codes and/or to indicate a color-shift immediately underneath and/or surrounding the overlaid QR codes.

Method 500 may include additional steps. For example, method 500 may include outputting the generated registration mark for further processing.

In addition, method 500 may be used in combination with method 400, described above. For example, step 420 of method 400 may comprise steps 520 and 530 of method 500.

Figure 6:
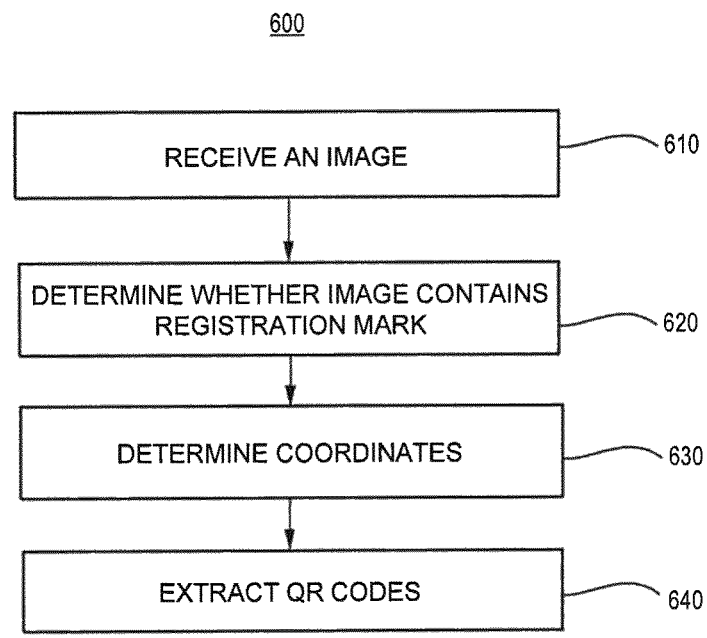
FIG. 6 is a flowchart of an exemplary method for decoding an intrinsic QR code, consistent with embodiments of the present disclosure.

FIG. 6 is a flowchart of exemplary method 600 for decoding an intrinsic QR code. Exemplary method 600 may be performed by, for example, system 700' of FIG. 7B. Exemplary method 600 may further be implemented using a general purpose computer or special purpose computer.

At step 610, the processor receives an image. For example, the image may be received from an image-receiving device, for example, a digital camera, network interface controller, bus, etc. The image may comprise a static image or a dynamic set of images such as video frames or an "animated" image. In some embodiments, receiving an image may further comprise dividing the image into a series of frames or images and processing each frame/image individually.

At step 620, the processor determines whether the image contains a registration mark. For example, a registration mark may be contained within the image, e.g., in a corner of the image. In other aspects, a registration mark may be external to the image, e.g., received separately by the image-receiving device, received separately from a memory, etc.

At step 630, the processor determines locations/coordinates within the image containing embedded QR codes using the registration mark. For example, the registration mark may contain a grid indicating which portions of the grid contain embedded QR codes; the processor may then select those portions of the image for further processing.

In some embodiments, the processor may instead determine location of embedded QR codes using one or more algorithms. For example, the processor may determine the optimal grid as described above in step 420 of FIG. 4. The processor may then employ a search algorithm to find embedded QR codes within the grid.

For example, the processor may apply a k-means clustering algorithm to determine sub-areas of the image (e.g., portions of the grid) having a relative minimum in color variance. Based on this determination, the processor may search for QR codes in the sub-areas having relative minima.

At step 640, the processor extracts QR codes from the determined locations/coordinates. For example, extracting QR codes may comprise determining that a portion of the selected location contains a color-shift, analyzing the color-shifted portion to separate a QR code having transparency from other layer(s) of the image, and decoding the separated QR code.

Method 600 may include additional steps, for example, after step 640. For example, method 600 may include steps of transmitting the decoded QR code to a display device or transmitting the decoded QR code for further processing. In certain aspects, the display device may be smartphone or a tablet.

For example, if one or more of the extracted QR codes are damaged or degraded in any way (for example, if a portion of the matrix is not decodable), the processor may implement a correcting process. For example, if the degraded QR code includes one or more context clues, the processor may be able to repair the QR code. In another example, the processor may compare the degraded QR code with a database of known intrinsic QR codes to identify one or more likely matches. Such a database may be stored remotely on a server. In another example, the processor may transmit the degraded QR code to a remote server for repair or for identification via a matching algorithm, as described above.

By way of further example, if the decoded QR code comprises a target location, the processor may retrieve digital content associated with the target location. For example, if the decoded QR code comprises a URL, the processor may transmit the URL to a web browser for further processing.

In a still further example, in response to decoding the QR code, the processor may transmit a notification to a third party. The third party may be indicated, for example, by the decoded QR code. Furthermore, the processor may receive digital content in response to transmitting the notification.

Figure 7A:
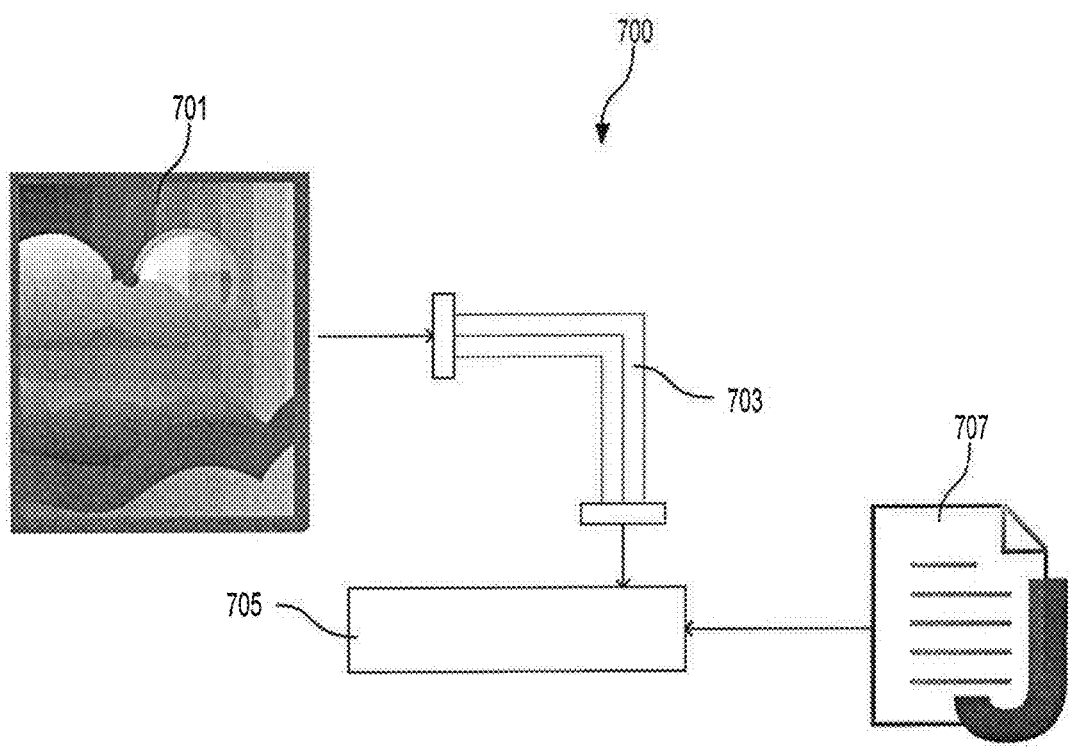
FIG. 7A is a schematic representation of a system for generating an intrinsic QR code and/or generating a registration mark, consistent with embodiments of the present disclosure.

FIG. 7A is a schematic representation of system 700 for generating an intrinsic QR code and/or generating a registration mark, consistent with disclosed embodiments. For example, system 700 may comprise a server.

As depicted in FIG. 7, system 700 may include an image-receiving device 703 configured to receive an image 701. For example, image 701 may comprise a digital static image or a digital dynamic image.

As depicted in FIG. 7A, image-receiving device 703 may comprise a bus (e.g., Integrated Drive Electronics (IDE), Enhanced IDS (EIDE), Serial ATA (SATA), SCSI, Serial Attached SCSI (SAS), or the like). Image 701 may thus comprise a digital image generated by image-receiving device 703 or a digital image received from a memory, e.g., a hard drive, a RAM, an SD card, a USB drive, etc., by image-receiving device 703, or the like.

In other embodiments, image-receiving device 703 may comprise a digital camera or a network interface controller (e.g., a WiFi NIC, a BlueTooth NIC, an ethernet NIC or the like). Image 701 may thus comprise a digital image generated by image-receiving device 703, a digital image received over a network by image-receiving device 703, or a digital image received from a memory.

As further depicted in FIG. 7, system 700 may include a processor 705 configured to receive image 701 from image-receiving device 703 and further configured to receive instructions 707.

In some embodiments, instructions 707 may be received from a memory, e.g., via a bus, or from a network, e.g., via a network interface controller. In other embodiments, instructions 707 may be integrated with processor 705, e.g., using one or more field-programmable gate arrays or other integrated circuit(s). In some embodiments, instructions 707 may comprise instructions to generate an intrinsic QR code and/or a registration mark, e.g., example method 400 of FIG. 4, example method 500 of FIG. 5, or any combination thereof.

Other embodiments that include additional components and/or exclude components depicted in FIG. 7 are possible. For example, additional hardware components used in a typical server or other computing device may be added to system 700.

Figure 7B:
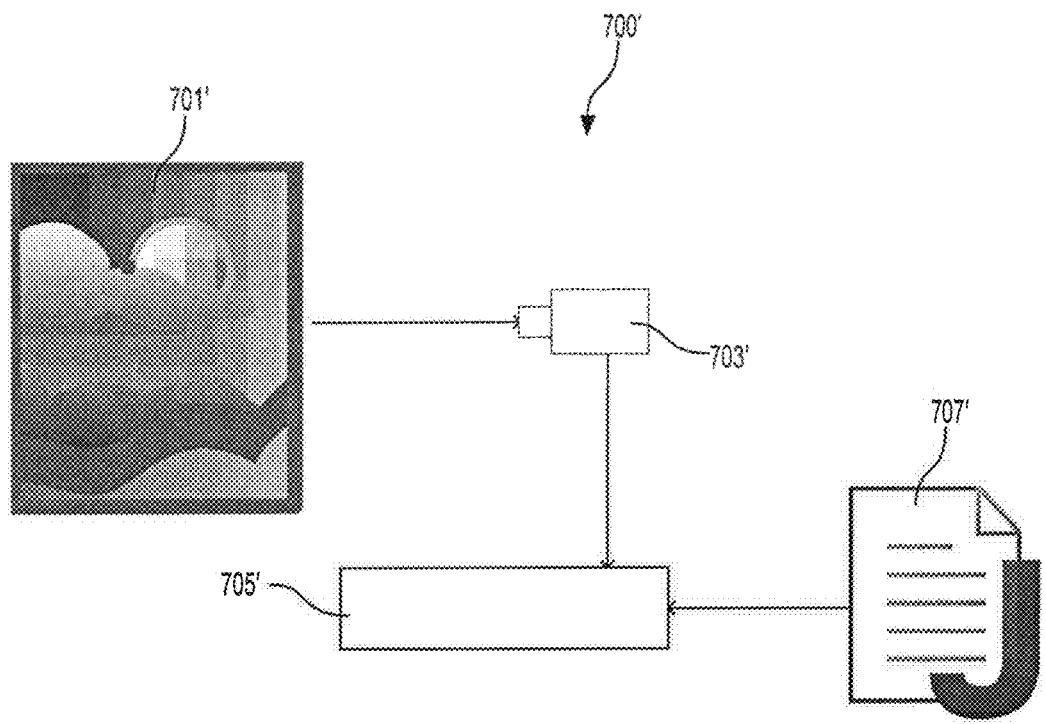
FIG. 7B is a schematic representation of a system for decoding an intrinsic QR code, consistent with embodiments of the present disclosure.

FIG. 7B is a schematic representation of system 700' for decoding an intrinsic QR code, consistent with disclosed embodiments. For example, system 700' may comprise a smart phone.

As depicted in FIG. 7B, system 700' may include an image-receiving device 703' configured to receive an image 701'. For example, image 701' may comprise a digital static image or a digital dynamic image. An intrinsic QR code may be overlaid in image 701'.

In some embodiments, image-receiving device 703' may comprise a digital camera. Image 701' may thus comprise a digital image generated by image-receiving device 703'.

In other embodiments, image-receiving device 703' may comprise a bus (e.g., Integrated Drive Electronics (IDE), Enhanced IDS (EIDE), Serial ATA (SATA), SCSI, Serial Attached SCSI (SAS), or the like) or a network interface controller (e.g., a WiFi NIC, a BlueTooth NIC, an ethernet NIC or the like). Image 701' may thus comprise a digital image generated by image-receiving device 703', a digital image received over a network by image-receiving device 703', or a digital image received from a memory, e.g., a hard drive, a RAM, an SD card, a USB drive, etc., by image-receiving device 703', or the like.

As further depicted in FIG. 7B, system 700' may include a processor 705' configured to receive image 701' from image-receiving device 703' and further configured to receive instructions 707'.

In some embodiments, instructions 707' may be received from a memory, e.g., via a bus, or from a network, e.g., via a network interface controller. In other embodiments, instructions 707' may be integrated with processor 705', e.g., using one or more field-programmable gate arrays or other integrated circuit(s). In some embodiments, instructions 707' may comprise instructions to decode an intrinsic QR code mark, e.g., example method 600 of FIG. 6.

Other embodiments that include additional components and/or exclude components depicted in FIG. 7B are possible. For example, additional hardware components used in a typical smart phone or other computing device may be added to system 700'.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for decoding a matrixed bar code, comprising:
   an image-receiving device;
   at least one processor configured to execute instructions; and
   at least one memory storing the instructions to perform operations comprising:
   receiving an image using the image-receiving device;
   determining a grid for the image, the grid having a plurality of cells;
   selecting at least one cell of the grid as a candidate cell for containing an intrinsic matrixed bar code;
   determining one or more coordinates of the intrinsic matrix bar code based on a detected color-shifting of a portion of the cell;
   extracting at least one intrinsic matrixed bar code located within the candidate cell at the one or more coordinates;
   determining that the at least one extracted matrixed bar code is degraded; and
   repairing the at least one extracted matrixed bar code.

2. The system of claim 1, wherein determining a grid comprises determining a grid that maximizes RGB variance across the cells of the grid.

3. The system of claim 1, wherein determining a grid comprises determining a grid that maximizes RGB variance in at least one cell of the grid.

4. The system of claim 1, wherein determining a grid comprises determining a grid that packs one or more monochrome portions of the image together within at least one cell of the grid.

5. The system of claim 1, wherein selecting the candidate cell comprises applying a k-mean clustering to determine one or more cells having a relative minimum in color variance.

6. The system of claim 5, wherein selecting the candidate cell comprises selecting the candidate cell from the one or more determined cells having a relative minimum in color variance.

7. The system of claim 1, wherein extracting the at least one matrixed bar code comprises determining that a portion of the candidate cell contains a color-shift and analyzing the color-shifted portion to separate the at least one matrixed bar code from the image.

8. The system of claim 1, wherein repairing the at least one bar code comprises using one or more context clue to extrapolate content for one or more degraded portions of the at least one matrixed bar code.

9. The system of claim 1, wherein the operations further comprise extracting information from the at least one matrixed bar code.

10. The system of claim 9, wherein the extracted information comprises a target location, and the operations further comprise using the target location to retrieve digital content corresponding to the target location.

11. A system for decoding a matrixed bar code, comprising:
an image-receiving device;
at least one processor configured to execute instructions; and
at least one memory storing the instructions to perform operations comprising:
receiving an image using the image-receiving device;
determining a grid for the image, the grid having a plurality of cells;
selecting at least one cell of the grid as a candidate cell for containing an intrinsic matrixed bar code;
determining one or more coordinates of the intrinsic matrix bar code based on a detected color-shifting of a portion of the cell;
extracting at least one matrixed bar code located within one or more of the candidate cells at the one or more coordinates;
determining that the at least one matrixed bar code is degraded;
sending the at least one matrixed bar code to a remote server for repair; and
receiving at least one repaired matrixed bar code from the remote server.

12. The system of claim 11, wherein determining a grid comprises determining a grid that maximizes RGB variance across the cells of the grid.

13. The system of claim 11, wherein determining a grid comprises determining a grid that maximizes RGB variance in at least one cell of the grid.

14. The system of claim 11, wherein determining a grid comprises determining a grid that packs one or more monochrome portions of the image together within at least one cell of the grid.

15. The system of claim 11, wherein selecting the candidate cell comprises applying a k-mean clustering to determine one or more cells having a relative minimum in color variance.

16. The system of claim 15, wherein selecting the candidate cell comprises selecting the candidate cell from the one or more determined cells having a relative minimum in color variance.

17. The system of claim 11, wherein determining that the at least one matrixed bar code is degraded comprises determining that one or more portions of the at least one matrixed bar code are not decodable.

18. The system of claim 11, wherein the remote server stores a database of known matrixed bar codes.

19. The system of claim 18, wherein the remote server compares the at least one matrixed bar code received from the system with the database to identify one or more likely matches.

20. The system of claim 19, wherein the at least one repaired matrixed bar code comprises the one or more likely matches.

* * * * *